US009282471B2

(12) United States Patent
Bradley

(10) Patent No.: US 9,282,471 B2
(45) Date of Patent: Mar. 8, 2016

(54) POSITIONING SYSTEMS FOR WIRELESS NETWORKS

(71) Applicant: Digimarc Corporation, Beaverton, OR (US)

(72) Inventor: Brett A. Bradley, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 13/833,679

(22) Filed: Mar. 15, 2013

(65) Prior Publication Data

US 2013/0316728 A1    Nov. 28, 2013

Related U.S. Application Data

(60) Provisional application No. 61/613,915, filed on Mar. 21, 2012.

(51) Int. Cl.
| *H04W 24/00* | (2009.01) |
| *G01S 5/02* | (2010.01) |
| *G01S 5/10* | (2006.01) |
| *H04W 64/00* | (2009.01) |
| *G01S 5/00* | (2006.01) |
| *G01S 5/14* | (2006.01) |

(52) U.S. Cl.
CPC .............. *H04W 24/00* (2013.01); *G01S 5/0289* (2013.01); *G01S 5/10* (2013.01); *G01S 5/0081* (2013.01); *G01S 5/145* (2013.01); *H04W 64/00* (2013.01)

(58) Field of Classification Search
CPC ..................... H04W 4/00; H04W 4/02–4/046; H04W 28/00–28/14; H04W 40/00–40/38; H04W 84/00–84/22
USPC ........ 455/404.2, 450–453, 456.1–456.6, 457; 370/310.2, 328, 395.2–395.43; 340/988; 701/207, 213–214, 216; 342/357.06, 357.01, 357.12, 450, 457
See application file for complete search history.

(56) References Cited

U.S. PATENT DOCUMENTS

| 4,193,073 A | 3/1980 | Kohnen |
| 4,405,986 A | 9/1983 | Gray |
| 5,045,861 A | 9/1991 | Duffett-Smith |
| 5,539,398 A | 7/1996 | Hall et al. |
| 5,838,279 A | 11/1998 | Duffett-Smith et al. |

(Continued)

OTHER PUBLICATIONS

Enge, P. et al., "Special Issue on Global Positioning System," Proceedings of the IEEE, vol. 87(1), p. 3-15, Jan. 1999.

(Continued)

*Primary Examiner* — Steve D Agosta
(74) *Attorney, Agent, or Firm* — Digimarc Corporation

(57) ABSTRACT

The invention provides a method of computing positioning of a mobile device in a wireless network. This positioning method receives associated pings exchanged among a network of nodes. The pings include count stamps of ping transmit and receipt, and a count stamp of a message received by the network nodes from the mobile device. The method evaluates count stamps to determine clock differences among clocks of the network nodes. From the clock differences, the method determines pseudo ranges between the network nodes and the mobile device. The method determines location of the mobile device by evaluating the differences between ranges of candidate positions of the mobile device and the pseudo ranges. It minimizing a function of error associated with the position candidates to determine the mobile device's location.

14 Claims, 4 Drawing Sheets

(56) References Cited

U.S. PATENT DOCUMENTS

| | | | |
|---|---|---|---|
| 5,929,806 | A | 7/1999 | Birchler et al. |
| 5,974,329 | A | 10/1999 | Wylie et al. |
| 6,084,547 | A | 7/2000 | Sanderford et al. |
| 6,094,168 | A | 7/2000 | Duffett-Smith et al. |
| 6,167,275 | A | 12/2000 | Oros et al. |
| 6,275,705 | B1 | 8/2001 | Drane et al. |
| 6,526,283 | B1 | 2/2003 | Jang et al. |
| 6,529,165 | B1 | 3/2003 | Duffett-Smith et al. |
| 6,650,877 | B1 | 11/2003 | Tarbouriech et al. |
| 6,694,142 | B1 | 2/2004 | Kuwahara et al. |
| 6,784,827 | B2 | 8/2004 | Hirt |
| 6,806,830 | B2 | 10/2004 | Panasik et al. |
| 6,894,644 | B2 | 5/2005 | Duffett-Smith et al. |
| 6,937,866 | B2 | 8/2005 | Duffett-Smith et al. |
| 7,224,984 | B2 | 5/2007 | Agrawala et al. |
| 7,260,407 | B2 | 8/2007 | Duffett-Smith et al. |
| 7,302,269 | B1 | 11/2007 | Crawford et al. |
| 7,315,745 | B2 | 1/2008 | Duffett-Smith et al. |
| 7,359,719 | B1 | 4/2008 | Duffett-Smith et al. |
| 7,382,804 | B2 | 6/2008 | Alapuranen et al. |
| 7,397,390 | B2 | 7/2008 | Dipiazza |
| 7,508,883 | B2 | 3/2009 | Duffett-Smith et al. |
| 7,593,736 | B1 | 9/2009 | Duffett-Smith et al. |
| 7,826,837 | B1 | 11/2010 | Sylvester |
| 7,876,266 | B2 | 1/2011 | Rhoads |
| 7,983,185 | B2 | 7/2011 | Rhoads et al. |
| 8,421,675 | B2 | 4/2013 | Rhoads et al. |
| 8,451,763 | B2 | 5/2013 | Brundage et al. |
| 8,463,290 | B2 | 6/2013 | Rhoads |
| 8,717,919 | B2 | 5/2014 | Rhoads et al. |
| 9,014,162 | B2 | 4/2015 | Brundage et al. |
| 2001/0004601 | A1 | 6/2001 | Drane et al. |
| 2002/0132631 | A1 | 9/2002 | Wesby et al. |
| 2002/0142782 | A1 | 10/2002 | Berliner et al. |
| 2002/0155845 | A1* | 10/2002 | Martorana ............... 455/456 |
| 2003/0001776 | A1 | 1/2003 | Hannah et al. |
| 2003/0014181 | A1 | 1/2003 | Myr |
| 2003/0054838 | A1 | 3/2003 | Carrez |
| 2003/0080902 | A1 | 5/2003 | Roberts |
| 2003/0119524 | A1 | 6/2003 | Carlsson |
| 2003/0220117 | A1 | 11/2003 | Duffett-Smith et al. |
| 2004/0002344 | A1 | 1/2004 | Moeglein et al. |
| 2004/0046693 | A1 | 3/2004 | Ogino et al. |
| 2004/0137915 | A1 | 7/2004 | Diener et al. |
| 2004/0203815 | A1 | 10/2004 | Shoemake et al. |
| 2005/0137786 | A1 | 6/2005 | Breed et al. |
| 2005/0281363 | A1 | 12/2005 | Qi et al. |
| 2007/0001903 | A1 | 1/2007 | Smith et al. |
| 2007/0040739 | A1 | 2/2007 | Small |
| 2007/0066231 | A1 | 3/2007 | Duffett-Smith et al. |
| 2007/0200759 | A1 | 8/2007 | Heidari-Bateni et al. |
| 2007/0232244 | A1 | 10/2007 | Mo et al. |
| 2007/0247368 | A1 | 10/2007 | Wu |
| 2008/0032709 | A1 | 2/2008 | Guvenc et al. |
| 2008/0158062 | A1 | 7/2008 | Fullerton et al. |
| 2009/0051568 | A1 | 2/2009 | Corry et al. |
| 2009/0061899 | A1 | 3/2009 | Hwang et al. |
| 2009/0073030 | A1 | 3/2009 | Hansen et al. |
| 2009/0111482 | A1 | 4/2009 | Rowe et al. |
| 2009/0170526 | A1 | 7/2009 | Strutt et al. |
| 2009/0213820 | A1 | 8/2009 | Hart |
| 2009/0213828 | A1* | 8/2009 | Brundage et al. ............. 370/338 |
| 2009/0228732 | A1 | 9/2009 | Budde et al. |
| 2009/0233621 | A1 | 9/2009 | Rhoads et al. |
| 2009/0273518 | A1 | 11/2009 | Duffet-Smith et al. |
| 2009/0281729 | A1 | 11/2009 | Duffett-Smith et al. |
| 2009/0313370 | A1 | 12/2009 | Rhoads |
| 2010/0045531 | A1* | 2/2010 | Rhoads ..................... 342/464 |
| 2010/0054237 | A1 | 3/2010 | Han et al. |
| 2010/0093374 | A1 | 4/2010 | Dacosta |
| 2010/0120435 | A1 | 5/2010 | Mia et al. |
| 2010/0135178 | A1 | 6/2010 | Aggarwal et al. |
| 2010/0150117 | A1 | 6/2010 | Aweya et al. |
| 2010/0164789 | A1 | 7/2010 | Basnayake |
| 2010/0178934 | A1 | 7/2010 | Moeglein et al. |
| 2010/0202300 | A1 | 8/2010 | Rhoads et al. |
| 2010/0265968 | A1 | 10/2010 | Baldemair et al. |
| 2010/0309051 | A1 | 12/2010 | Moshfeghi |
| 2011/0080317 | A1 | 4/2011 | Alizadeh-Shabdiz et al. |
| 2011/0095946 | A1 | 4/2011 | Del Castillo |
| 2011/0255528 | A1* | 10/2011 | Zakrzewski ............... 370/350 |
| 2013/0273935 | A1 | 10/2013 | Amizur et al. |

OTHER PUBLICATIONS

Braasch, M.S. et al., "GPS Receiver Architectures and Measurement," Proceedings of the IEEE, vol. 87(1), p. 48-64, Jan. 1999.

Misra, P. et al., "GPS Performance in Navigation," Proceedings of the IEEE, vol. 87(1), p. 65-85, Jan. 1999.

GPS Joint Program Office, "Navstar GPS Space Segment/Navigation User Interfaces," Navstar Global Positioning System, Interface Specification, IS-GPS-200, Revision D., ARINC Engineering Services, LLC, Dec. 7, 2004.

US. Joint Planning and Development Office (JPDO), Air Navigation Services Working Group, "FAA's Surveillance/Positioning Backup Strategy Alternatives Analysis." Paper No. 08-003, Jul. 15, 2008.

US. Federal Aviation Administration, "Fact Sheet—NextGen." Feb. 14, 2007, available at <<http://www.faa.gov/news/fact.sub.--sheets/news.sub.--story.cfm?newsID=8145>>.

Notice of Allowance dated Jul. 25, 2012, and Notice of Allowance dated Dec. 17, 2012, in U.S. Appl. No. 12/426,787.

Appeal Brief dated May 3, 2012, in U.S. Appl. No. 12/373,944.

Examiner's Answer dated Jul. 24, 2012, in U.S. Appl. No. 12/373,944.

Notice of Allowance dated Jun. 13, 2012, in U.S. Appl. No. 12/429,030.

International Search Report and Written Opinion dated Oct. 1, 2012, in PCT/US2012/046265.

H. Feng et al., Positioning models and systems based on digital television broadcasting signals, Frontiers of Electrical and Electronic Engineering in China, vol. 2(4), p. 410-414, 2007.

Widnall et all, "Stability of the Decentralized Estimation in the JTIDS Relative Navigation", IEEE Transactions on Aerospace and Electronic Systems, vol. AES-19, No. 2, Mar. 1983.

Notice of Allowance dated Feb. 7, 2013, in U.S. Appl. No. 13/179,807.

Final Office Action dated Aug. 13, 2014, in U.S. Appl. No. 13/187,723.

International Preliminary Report on Patentability dated Oct. 2, 2014, in PCT/US2013/033058.

Office Action dated Jan. 22, 2015 in U.S. Appl. No. 13/187,723.

Final Office Action dated Jun. 18, 2015 in U.S. Appl. No. 13/187,723.

Ciurana et al, "A Ranging Method With IEEE 802.11 Data Frames for Indoor Localization", WCNC 2007 proceedings.

Bahillo et al., "Indoor Location Based on IEEE 802.11 Round-Trip Time Measurements With Two-Step NLOS Mitigation", Progress in Electromagnetics Research B, vol. 15, 285-306, 2009.

U.S. Appl. No. 61/116,996, filed Nov. 21, 2008.

* cited by examiner

POSITIONING SYSTEMS FOR WIRELESS NETWORKS

RELATED APPLICATION DATA

This application claims benefit of U.S. Provisional Application No. 61/613,915, filed Mar. 21, 2012.

TECHNICAL FIELD

The invention relates to positioning and timing systems, and more particularly relate to positioning of mobile devices in wireless networks.

BACKGROUND AND SUMMARY

The field of positioning systems is highly developed with a wide variety of signal processing and computational techniques documented in the literature, some of which are implemented in ubiquitous standards, like GPS. Though the field is well developed, there remain application spaces where existing techniques are either inadequate or impractical to implement. One such area is indoor positioning and positioning within dense urban environments.

It is advantageous when existing network technologies can be adapted provide to inherent positioning and timing calibration. Such approaches leverage existing communication components (e.g., RF radios of network nodes) and device clocks to provide positioning and timing. Specific examples of this type of approach are described in Assignee's U.S. Pat. Nos. 7,876,266, 7,983,185, Published US Patent Applications 20090233621 and 20090213828, and unpublished U.S. patent application Ser. No. 13/187,723 filed Jul. 21, 2011, entitled MULTI-PATH-COMPENSATION METHODS FOR LOCATION-DETERMINATION OF MOBILE DEVICES, and Ser. No. 13/179,807 filed Jul. 11, 2011, entitled LOCATION AWARE INTELLIGENT TRANSPORTATION SYSTEMS, which are hereby incorporated by reference in their entirety (referred to as "space-time calibration patents").

The positioning and timing schemes described in this document relate to these space-time calibration patents. Several new positioning and timing methods are disclosed, along with system architectures and data structure configurations for implementing the methods in many different network configurations.

The invention provides a method of computing positioning of a mobile device in a wireless network. This positioning method receives associated pings exchanged among a network of nodes. The pings include count stamps of ping transmit and receipt, and a count stamp of a message received by the network nodes from the mobile device. The method evaluates count stamps to determine clock differences among clocks of the network nodes. From the clock differences, the method determines pseudo ranges between the network nodes and the mobile device. The method determines location of the mobile device by evaluating the differences between ranges of candidate positions of the mobile device and the pseudo ranges. It minimizes a function of error associated with the position candidates to determine the mobile device's location.

In various applications, multipath error presents a significant challenge to accurate positioning. Embodiments of the method estimate the error and remove it from range estimates prior to locating the mobile device (prior to "emplacement" of the mobile device), or evaluate it as part of the process of determining the mobile device location from the pseudo range estimates (referred to as "emplacement").

The method scales to provide a positioning service for several mobile devices within a network at a venue, and for several positioning networks for different venues. In one embodiment, a router receives ping data from network nodes and sorts it into data structures based on mobile device ID and message ID. The router provides the data structures to a network service, such as web based cloud computing service, to provide location and timing information for each of the mobile devices.

This document details several novel methods for determining positioning and timing within networks. One inventive method for computing positioning of a mobile device comprises:

receiving a message sent from a mobile device at each of a set of network nodes at corresponding network node locations;

exchanging pings among the network nodes, including assigning local clock values to pings upon sending and receiving the pings;

from the local clock values exchanged among the network nodes, determining clock differences among the network nodes;

from the clock differences, determining path delay between the network nodes;

from data provided by the network nodes about receipt of the message and the path delays, determining pseudo range estimates between the mobile device and the network nodes; and determining location of the mobile device by evaluating differences between candidate positions of the mobile device and the pseudo range estimates, and selecting a candidate location with minimum error criteria as the location of the mobile device.

There are many variations and enhancements of the above method. In one enhancement, the multipath error is estimated for the network nodes and removed from the pseudo range estimates. The multipath error is estimated for the network nodes and removed from the pseudo range estimates prior to determining the location, or is estimated and compensated for in the determining of the location of the mobile device.

There are full duplex and transmit only modes of operation. Full duplex modes are where network nodes transmit and receive pings and count stamp them. The transmit-only mode refers to cases where mobile devices transmit messages only, and do not count stamp them. Rather, receiving infrastructure nodes count stamp them and share data about the receipt of identified messages from mobile devices. In this mode, the method derives differential ranges of the network nodes to the mobile device from count stamps of the message at the network nodes. The differential ranges for sets of nodes are then used to estimate pseudo ranges between the mobile device and the nodes.

In any of the modes, full duplex exchanges between network nodes can be used to determine path delays of nodes so that the path delays can be accounted for in determining pseudo ranges.

Embodiments of our positioning methods evaluate clock value differences between pairs of network nodes over time to determine the clock differences of local clocks within the network nodes. This evaluation comprises a linear modeling of fitting clock count differences to a linear model to derive clock difference parameters among pairs of nodes. A consistency checking process, such as median approach, may be applied to clock count data before applying the linear modeling. In general, the consistency check evaluates data collected over time and removes outlier clock count data.

The process of locating the mobile device from range data is referred to as emplacement. Embodiments of emplacement evaluate variation of a differential between ranges of candidate positions of the mobile device and the pseudo range estimates (called residual), and select a location where the variation of the differential satisfies predetermined criteria. The estimated multipath error may be used to compensate for multipath error in computing the differential.

Various other multipath mitigation and compensation schemes are described. In one scheme, the multipath error is estimated by determining areas in the network with similar estimated multipath error and assigning multipath errors corresponding to the areas to the network nodes within the areas. That assigned estimate can then be used to compensate for multipath error in range calculations or emplacement associated with those nodes.

Another scheme estimates multipath error by evaluating differential range estimates of network nodes relative to the mobile device computed from the message sent to the network nodes from the mobile device, and assigning multipath error estimates to each of several pairs of nodes. For each node that is a member of a pair, the multipath estimates for the pairs can then be used to set a multipath error for the node.

In another scheme, multipath estimates are refined by averaging estimates of multipath error from un-correlated conditions. The refined estimates of multipath error are then used to compensate for multipath error in determining the mobile device location (e.g., in the emplacement process).

Further features will become apparent with reference to the following detailed description and accompanying drawings.

DETAILED DESCRIPTION

In the following section we detail several examples of systems for computing positions of mobile devices in wireless networks. These systems are related to prior work detailed in the space-time calibration patents incorporated above. These patent documents describe space-time calibration systems for a variety of applications, including positioning systems for networks of nodes that communicate wirelessly. Using the techniques described in these documents, the nodes within a network cooperate by transmitting pings to each other, determining a clock count value upon ping transmit or receipt and associating the events of ping transmission and receipt among nodes. A space-time calibration unit takes this information and calculates position and timing information for the network. This calibration can be used to provide locations for nodes, as well as calibration of clocks within the nodes, as those clocks are independent and have differing clock rates.

This document describes various embodiments for calculating position of mobile nodes in wireless networks. The space-time calibration patents provide background for these embodiments, as they describe examples of configurations for transmitting and receiving pings and associating these ping transmissions and receipts in preparation for space time calibration. The positioning techniques described in this document also operate on associated pings and provide additional techniques for computing positioning and timing information.

Figure 1:
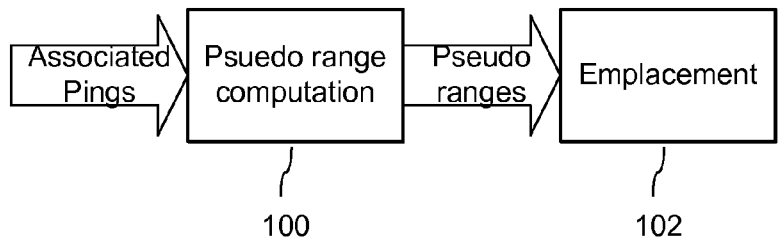
FIG. 1 is a general block diagram illustrating a positioning system that receives associated transmit/receive events (called pings) among nodes in a network and determines position of a mobile node.

FIG. 1 is a general block diagram illustrating a positioning system that receives associated transmit/receive events (called pings) among nodes in a network and determines position of a mobile node. A first software stage 100 receives associated pings from a network of nodes, including at least one mobile device of unknown location, and provides pseudo ranges between the mobile device and each of a set of additional network nodes in wireless communication with the mobile device or each other. A second software stage 102 takes the pseudo ranges and computes the location of the mobile device in a process called "emplacement." This software process can be executed in one or more computing devices, such as in a server or servers of a web service, within a router connected to the positioning network, a network node in the positioning network (such as a wireless access point device, fixed-location infrastructure node, or a mobile device in the network).

Figure 2:
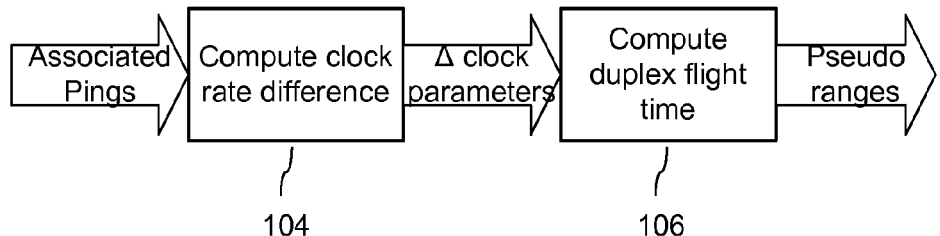
FIG. 2 is a block diagram illustrating a process for computing pseudo ranges between a mobile device and nodes in a positioning network.

In the following embodiment for a full duplex mode of nodes in a wi-fi network, clock parameters and range parameters are solved for in a two-step process as depicted in FIG. 1. FIG. 2 is a block diagram illustrating the first step. First, the clock rate difference between all pairs of nodes is computed (104). Next, the duplex flight-time of pings between each pair of clocks is computed (106). The already computed rate difference between the clocks is used to correct the duplex flight-time for clock drift. The outcome of this procedure is an estimate of the distance between each pair of nodes (called pseudo ranges). Finally, the position of each node is estimated in the process of emplacement. The following full duplex embodiment does not require an initial estimate of the clock positions. Full duplex refers to a case where the nodes transmit and receive pings and countstamp them. Later, we describe an embodiment that is not full duplex, in which the mobile device being located is less cooperative (e.g., transmit only and no countstamp on send).

Measuring Clock Rate Difference Between a Pair of Nodes

The first step in solving for the position of a mobile node involves measuring the clock rate difference between the mobile node's clock and that of another node that we wish to measure the mobile node's distance from. Once the rate differences are known, range measurements between nodes are estimated using a "pingloop" calculation.

The Clock Rate Relationship

The relationship between the countstamps of a pair of clocks is well-approximated by the linear relationship of equation (1), over a time window on the order of a second.

$$y - y_0 = (x - x_0) * (1 + \Delta_{1,2}) \quad (1)$$

The countstamps of clock 1 are given by x, where $x_0$ is the initial countstamp in the set of countstamps. The countstamps of clock 2 are given by y. Usually, the clocks run at approximately the same rate. The clock rate difference between the pair of clocks is expressed as the small number $\Delta_{1,2}$. We see that if $\Delta_{1,2}$ is a positive number, the countstamps of clock 2 grow relative to those of clock 1. The countstamp pairing here is not arbitrary. Rather, it is a consequence of the same ping. In practice, there are two ways in which this relationship exists:
1. The countstamps of clock1 are transmit countstamps and those of clock 2 are receive countstamps; i.e. clock 1 countstamps a ping at the time of transmission and clock 2 receives and countstamps the same ping.
2. Both the countstamps of clock 1 and clock 2 are receive countstamps. A transmitter multicasts a ping that is then received and countstamped by both clock 1 and clock 2.

In either case, a software routine finds and matches the countstamps between the pair of clocks. This process uses a ping identifier to match the transmit and receive countstamps. In particular, the transmitter includes a message number with the outgoing ping. To see how clock rate difference is calculated between a pair of clocks, we re-write equation 1) in canonical slope-intercept form:

$$y - x = \Delta_{1,2} * (x - x_0) + b \quad (2)$$

The intercept, b, is the initial clock rate difference $y^* - x_0$. Note that $y^*$ is different from $y_0$. The former is the least squares fit of all measurements, while the latter is clock2's countstamp value when clock1's countstamp value is $x_0$. To solve for $\Delta_{1,2}$ in equation 2), we use linear regression. The intercept in the equation, b, is not of interest here.

$$\Delta_{1,2} = \frac{N \sum((x - x_0)(y - x)) - \mu_{x-x_0} \mu_{y-x}}{N \sum (x - x_0)^2 - (\sum (x - x_0))^2} \quad (3)$$

In equation (3), $\mu_{x-x_0}$ and $\mu_{y-x}$ are the means of each of N measurements of $(x_i - x_0)$ and $(y_i - x)$, respectively. Our approach is to generate one estimate of $\Delta_{1,2}$ per receiver pair, per transmitter. So, if a pair of receivers hears M different transmitters, we obtain M distinct estimates of $\Delta_{1,2}$. Glitches in the countstamping procedure can sometimes cause individual $\Delta_{1,2}$ estimates to be way off the mark. Therefore, we combine the M different estimates of $\Delta_{1,2}$ into a single estimate using a robust form of averaging. Specifically, if any of the $\Delta_{1,2}$ are outside of some consistency tolerance they are discarded and do not contribute to the final estimate.

Refining Clock Rate Difference Estimates

The result of the clock rate difference calculation is one clock rate difference estimate for every possible pair of nodes. If for example, there are ten nodes in the network, we can form 45 pairs by plugging 10 into equation (4).

$$\text{\# Node pairs} = (\text{num\_node}) * (\text{num\_nodes} - 1)/2 \quad (4)$$

The set of clock rate difference estimates can be further refined by taking into account the relationship between the clock rate estimates. For example, knowing $\Delta_{1,2}$ and $\Delta_{1,3}$ tells us what $\Delta_{2,3}$ should be. The relationship is given by equation (5).

$$\Delta_{2,3} = \Delta_{1,3} - \Delta_{1,2} \quad (5)$$

Similar expressions involving all the clocks are rolled-up into a matrix, H, with (#Node pairs) rows and num_nodes columns. Under noiseless conditions, the multiplication of this matrix with the (num_nodes−1) clock rate differences between node1 and the remaining system nodes tells us what the clock rate differences of all other clock pairs should be. Under noisy conditions, we can turn this relationship on its head by solving the matrix equation of (6)

$$F = pinv(H) * \text{deltaSet}, \text{ where} \quad (6)$$

deltaSet=[delta$_{1,2}$, . . . , $\Delta_{1,num\_nodes}$, $\Delta_{2,3}$, . . . , $\Delta_{num\_nodes-1,num\_nodes}$]

Then, if we multiply F by H, we get a refined estimate of deltaSet. It is often not necessary in practice to perform this refinement step because the improved clock difference resolution does not necessarily translate into improved range measurements. This is especially true in a multipath rich environment, where range errors due to multipath dominate other sources of error.

Determining Ranges: the Ping Loop Calculation

Once we have solved for clock rate differences between the nodes we are ready to compute the ranges between each possible node pair. In some cases, the range between nodes of known position is of little interest and can hence be skipped. Other times such calculations are required because they shed light on certain nuisance parameters that hamper the ultimate positioning of a mobile node.

The ping loop calculation begins with finding all instances of full-duplex communication between a chosen pair of nodes in a specified time interval. That is, we single out the pings between the pair of nodes. This operation results in something like the situation shown in Table 1. The next step is to sort the set of pings from earliest occurrence to latest. For the example given in Table 1, the sorting has already been performed.

TABLE 1

| Event # | Tx ID | Tx Countstamp | Rx ID | Rx Countstamp |
| --- | --- | --- | --- | --- |
| 1 | 1 | 10000 | 2 | 20001 |
| 2 | 2 | 20050 | 1 | 10050 |
| 3 | 1 | 10100 | 2 | 20102 |
| 4 | 2 | 20150 | 1 | 10149 |

Once we have the data in the format of Table 1, we find all instances where node1 transmits to node 2. For each transmission in this set of transmissions, we look for the earliest subsequent transmission of node2 back to node1. For the example given in Table 1, Events 1 and 3 are transmissions from node 1 to node 2. Event 2 is the earliest subsequent transmission to Event 1 of Node 2 back to Node 1. Likewise, Event 4 is the earliest subsequent transmission to Event 3 of Node 2 back to Node 1. Each of the pairings (Event1, Event2) and (Event 3, Event 4) constitutes a ping loop.

$$Rx_1 - Tx_1 = (Tx_2 - Rx_2)(1 + delta_{1,2}) + 2 * d_{1,2} + \alpha_1 + \alpha_2 + p_{1,2} \quad (7)$$

Where $d_{1,2}$ is the distance between the nodes, $\alpha1$ and $\alpha2$, are the intrinsic device receiver delays, and $p_{1,2}$ is a multipath delay between the nodes. Equation (7) is expressed in a slope-intercept format in equation (8):

$$(Rx_1-Tx_1)-(Tx_2-Rx_2)=\Delta_{1,2}*(Tx_2-Rx_2)+2d_{1,2}+\alpha_1+\alpha_2+2p_{1,2} \quad (8a)$$

$$y=m*x+b \quad (8b)$$

In equation 8, the ordinate, y, is a difference relation between countstamps. The slope, m, is the clock rate difference. The abscissa, x, is the difference in count units between the time clock2 receives a ping from node1 and the time it transmits back to node1. Finally, the intercept, b is the combination of flight time, receiver delays, and multipath delay.

Given the four countstamp values and the estimated clock rate difference, equation (8) shows how to obtain the intercept, b.

Graphical Interpretation of a Pingloop

Figure 3:
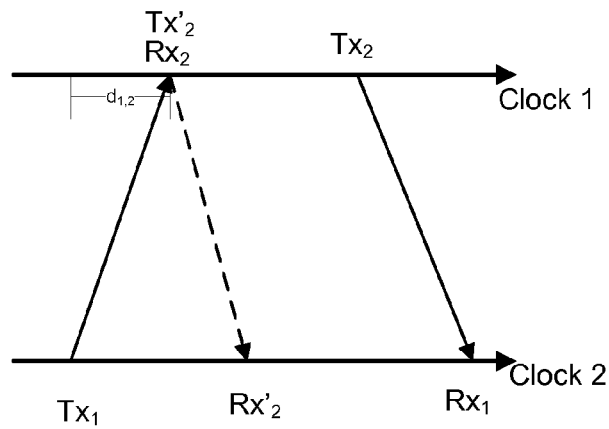
FIG. 3 shows clock axes of a pair of network nodes involved in duplex communications.

FIG. 3 shows the clock axes of a pair of nodes involved in duplex communications.

In FIG. 3, Clock 1 transmits to Clock2 at time $Tx_1$ according to its own clock. Clock 2 receives the transmission at time $Rx_2$ according to its clock. The flight time is designated as $d_{1,2}$. A straight vertical arrow would connect Clock1's axis at time $Tx_1$ to Clock2's axis if the flight time were 0. For simplicity, we have ignored other sources of delay, namely $\alpha_2$ and $p_{1,2}$. These could be incorporated into the figure by replacing $d_{1,2}$ with the sum $(d_{1,2}+\alpha_2+p_{1,2})$. At a later point in time, $Tx_2$, Clock2 transmits a ping to Clock 1, which is received at time $Rx_1$. According to equation (8), directly measuring the intercept would require setting the abscissa, $Tx_2-Rx_2$, to zero, which occurs when Clock2 simultaneously receives a ping from Clock1 and transmits to Clock1. This situation is illustrated with the countstamp values, $Tx'_2$ and $Rx'_1$, and the dashed line from Clock2 to Clock 1. The quantity $(Rx'_1-Tx_1)$ is a direct measure of the total delay, $(2d_{1,2}+\alpha_2+2 p_{1,2}+\alpha_1)$. By using equation (8), we have effectively achieved the condition illustrated by the loop involving the dashed line, and hence we are able to obtain an estimate of the total delay directly.

Special Cases

In practice, not all the quantities that comprise the total delay, $2d_{1,2}+\alpha_2+2 p_{1,2}+\alpha_1$, are unknown. Before exploring these cases, we address the fact that $p_{1,2}$ can be made more general by not restricting it to the same value for transmission from node 1 to node 2 as for the reverse case. Such an asymmetry in the path delay has not been observed to be of significant importance to model in practice.

In a system with N nodes, we obtain N(N−1)/2 total delay relations (set of equations) involving all possible node pairs. The completely general case in which all delay parameters are unknown is intractable. For example, if all $p_{n,m}$ are unknown and non-zero and all other quantities are known, the set of delay relationships is exactly determined. The set of equations becomes under-determined if we include the N receiver delays in the unknown category along with the path delays. The same is true of the N(N−1)/2 pairwise distance relationships, although in this case the number of unknowns is actually less than N(N−1)/2 via the geometrical relationship between node position and distance.

Known Receiver Delays

Transmission between node pairs often involves nodes that are part of the backbone of the network. These nodes have receiver delays that can easily be measured in a network calibration phase. Moreover, if these backbone nodes are all the same type of unit, the delays may sometimes be regarded as identical. At any rate, the known delays can be subtracted directly from the received countstamps to remove their effect. The delay can also be removed when the node pair involves one or more mobile nodes provided the delay characteristics of the device are known a priori.

Known Node Distances

A typical situation in which the distance between a pair of nodes is known is when the nodes are elements of the backbone of the network. In this case, the positions of the nodes are known and fixed. This allows the distance between the nodes to be calculated and subtracted from the received countstamps involving that pair. Alternatively, this subtraction may be delayed until the bias term is computed, equation (8).

Another situation involves the tracking problem in which one or more mobile nodes comprise the node pair and we have an initial position estimate of said node(s). The initial distance estimate is removed as per the method of the previous paragraph, leaving a residual error. An emplacement algorithm then operates on this residual value to update the node positions.

Mixed Cases Involving Path Delays

There are several interesting cases here. One involves receivers of unknown intrinsic delay and known position. Here, there are N(N−1)/2 equations and at least N unknowns. We can solve uniquely for the set of N intrinsic receiver delays provided at least (N(N−1)/2−N) of the path delays are zero, or are at least of unappreciable size. Closely related to this is the tracking problem. In this case we have a previous estimate of the distance, and we know the intrinsic delays of all devices. The unknowns here include the path delay between the node pair and the change in distance between the nodes. We cannot generate a unique solution without using the relationships between the tracked mobile node and other network nodes. A third case, which is most relevant to commercial applications, involves the combination of unknown path delay and unknown mobile position. Receiver delays are presumed known. In this scenario all available total delay measurements involving the mobile node are used. Furthermore, some of the path delays must be small. These are the conditions under which we have implemented and operated multipath mitigation techniques with success. These techniques are described further below. Additional ways of compensating for multipath are described in Ser. No. 13/187,723 filed Jul. 21, 2011, entitled MULTI-PATH-COMPENSATION METHODS FOR LOCATION-DETERMINATION OF MOBILE DEVICES, which is hereby incorporated by reference in its entirety.

Emplacement

Emplacement refers to the procedure by which the position of a mobile node is estimated. The mobile node's position may have been known or estimated at a recent previous point in time (node tracking). Alternatively, the node's position may be more generally unknown (general emplacement). In this case the possible positions of the mobile node are bounded by an area that encompasses the range of the other nodes it communicates with.

Node Tracking

Our approach to node tracking begins with the relationship between two nodes in two dimensions, one fixed and the other moving. The distance relationship between the two nodes at some initial point, $t_0$, in time is given by equation (9)

$$d^2 = (x_f - x_0)^2 + (y_f - y_0)^2 \qquad (9)$$

In equation (9), d is the distance between the nodes. The Cartesian pairs $(x_f, y_f)$ and $(x_0, y_0)$ are the coordinates of a fixed node and a mobile node, respectively. At a second point in time, $t_1$, the distance relationship is given by equation (10)

$$(d+\Delta)^2 = (x_f - (x_0 + d_x))^2 + (y_f - (y_0 + d_y))^2 \qquad (10)$$

Here, dx and dy represent the change in respective x and y position of the mobile. Provided $\Delta$ is small, i.e. the mobile node has not moved very much during the time interval ($t_1 - t_0$), equation (9) is well-approximated by the linear relationship of equation (11).

$$2d\Delta + \Delta^2 \approx -2dx(x_0 - 1) - 2dy(y_0 - 1) \qquad (11)$$

In equation 10, there are two unknowns, dx and dy. The quantity on the left-hand-side of the equation is derived from the new range estimate, $(d+\Delta)^2$, and d. Extending to N nodes and three dimensions, there are N−1 equations (number of range estimates) and three unknowns (dx, dy, and dz). This leads to an over-determined solution for the unknowns provided there are at least five nodes in the network.

One caveat to the foregoing is that the solutions (dx, dy, dz) do not necessarily lead to an improved position estimate relative to simply leaving the position unchanged. Therefore the solution is checked to see if there is a reduction in residual error, equation (12).

$$e_0 = \Sigma_{i=1}^{N-1} (r_i - d_i)^2 \qquad (12a)$$

$$e_1 = \Sigma_{i=1}^{N-1} (r_i - d'_i)^2 \qquad (12b)$$

In equation (12), the set $r_i$ comprise the range measurements from the mobile to each of the other N−1 nodes. The $d_i$ are the initial distances to each of the nodes and the $d'_i$ are the distances after incorporating the estimated change in mobile position, (dx,dy,dz). The quantities $e_0$ and $e_1$ are the residual errors. If $e_1$ is less than $e_0$, we update the mobile's position using the estimate (dx,dy,dz). Otherwise, we leave the position unchanged.

In situations where there are multiple mobile nodes in full-duplex communication with each other, equation (11) does not fully apply when both of the nodes involved are in motion. Nevertheless, pretending that one of the nodes is fixed seems to work well enough when the change in position is small relative to the update interval. One could apply iterative methods in which the position of each mobile node is updated several times for a given set of range measurements. For example, the position of each mobile node is updated using the method described above. Then, the same process is applied using the newly updated positions for each mobile node to get an improved position estimate for each of the mobiles, etc. In many situations, however, such iteration is probably unnecessary.

General Emplacement

The strategy for general emplacement is to perform an exhaustive search for a position that provides a "best fit" to the data. "Data" in this case refers to any known node positions and the set of range measurements between the mobile node and the other N−1 nodes. Equation (9) describes the relationship between the mobile node's unknown position $(x_0, y_0)$, the position of the fixed node $(x_f, y_f)$ and the range between them, d. There are N−1 such relations involving the mobile and each of the fixed nodes. The emplacement relation is described by equation (13):

$$p^* = \mathrm{argmin}_j \Sigma_i^{N-1} (\|x_i - m_j\| - r_i)^2 \qquad (13)$$

In equation 13, the vector $x_i$ is the position of the $i^{th}$ fixed node. Similarly, $m_j$ is the $j^{th}$ candidate position of the mobile. The range measurement between the $i^{th}$ fixed node and the mobile is given by $r_i$. The best mobile position estimate is obtained by choosing the position that minimizes (13). Implementation of equation (13) involves defining a grid of candidate mobile locations, pre-computing the distance between each candidate position and each fixed node ($\|x_i - m_j\|$), and putting the result in a look-up-table.

Complicating Factors

The purpose of this section is to provide and characterize a laundry list of issues that alter or hamper the procedure described above.

1. Countstamp inaccuracies: countstamping is not always reliable on both the receiving and transmitting ends for a variety of reasons. It is important that under such conditions the core positioning algorithms identify and remove bogus countstamps. Generally, this is done through consistency checking methods.
2. Clock resets: It is not uncommon for clocks to reset their counters. If left unchecked this causes problems during both the clock rate difference and pingloop calculations because the true relationships go from linear to piecewise linear.
3. Variable path delay: multipath is a highly variable phenomenon when one or more of the nodes involved in duplex communications is in motion. Moreover, even when a node pair is fixed the path delay can vary. In this situation, too, inaccuracies may occur in clock rate difference and pingloop calculations. Ideally, strategies should be deployed to detect and mitigate any corresponding problems.
4. Unknown mobile delay: When the intrinsic device delay of a mobile is unknown and this mobile has unknown initial position, equation (13) cannot be used because the range terms, $r_i$ all contain an offset that is equal to this unknown receiver delay. There are several ways to deal with this issue. Perhaps the most straightforward is to modify equation (13) to be invariant to a constant bias in the range measurements.
5. Non-full-duplex communications: In practice many devices are not equipped to both countstamp packets that they transmit and countstamp packets that they receive. A typical situation is that a network is comprised of a number of fixed position nodes that have full-duplex connectivity. Mobile nodes of unknown position send pings to the fixed nodes in order to obtain position estimates. The mobile nodes are incapable of countstamping packets that they transmit and they are also incapable of receiving pings from any other node. Position estimates are obtained using most of the same procedures described herein as well as a few additional procedures that are detailed further below.
6. Unknown residual path delays (aka multipath): One of the more vexing problems is general emplacement when the ranges in equation (13) are corrupted by unknown quantities of multipath. If left unmitigated, applying equation (13) in such cases leads to large positioning errors. One procedure for handling this situation is to apply a multipath compensation technique to the ranges, which estimates and removes some of the path delay using node geometry. After multipath compensation is applied, general emplacement is applied to position the mobile node(s).

Transmit Only Mobile Devices

Building upon the description above, this section describes an example of an implementation where full-duplex communication is not available for the mobile node being located. This implementation determines the location of a mobile node (e.g., smartphone or other mobile wi-fi enabled device) that transmits pings, but is incapable of countstamping packets that it transmits and is incapable of receiving pings. This is particularly useful for providing location to a consumer's personal mobile device, such as a cell phone, with minimal cooperation of that device (e.g., it only needs to transmit packets that multiple nodes in the network receive and countstamp).

Table 2 below provides an example of associated pings for this configuration.

TABLE 2

| Tx ID | Tx Countstamp | Rx ID | Rx Countstamp |
|---|---|---|---|
| 2 | 5000 | 1 | 8000 |
| 2 | 5200 | 1 | 8100 |
| 1 | 8050 | 2 | 5100 |
| −3 | M2 | 2 | 8200 |
| 3 | 5000 | 3 | 10000 |

There are two types of devices in the network for generating pings, infrastructure nodes that transmit and receive pings, and mobile nodes that only transmit messages, without countstamping them. The message transmission depicted in the third row of Table 2 has a negative transmit ID, simply to reflect that it is a mobile device. It does not have a transmit countstamp, as this mobile device does not provide one. Rather, the packets transmitted by the mobile device are simply identified by a message identifier, e.g., M2 of mobile device (−3) (to reflect the second message sent from device, −3). Infrastructure nodes receive this message and countstamp it. They also operate in full duplex mode relative to each other, transmitting and receiving pings and countstamping on transmit and receipt of pings. Ping events collected for pings exchanged among the infrastructure nodes are used to estimate a baseline clock difference. Path delays between infrastructure nodes are estimated with pingloop calculations, similar to the method described above for full duplex mode. The baseline clock difference and path delays are then used to compute pseudoranges between the mobile device and infrastructure nodes. These pseudoranges, in turn, are provided to the emplacement process to compute location of the mobile device.

Figure 4:
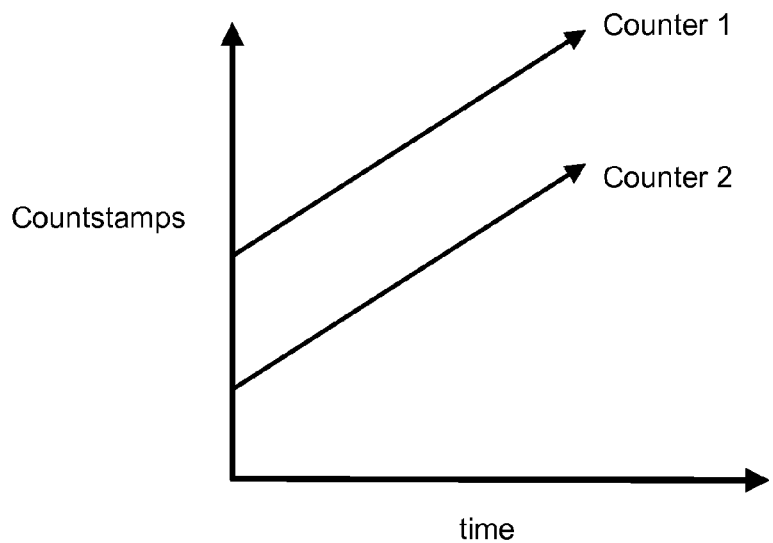
FIG. 4 is a plot of the count stamps output from counters 1 and 2 for respective network devices over time.
Figure 5:
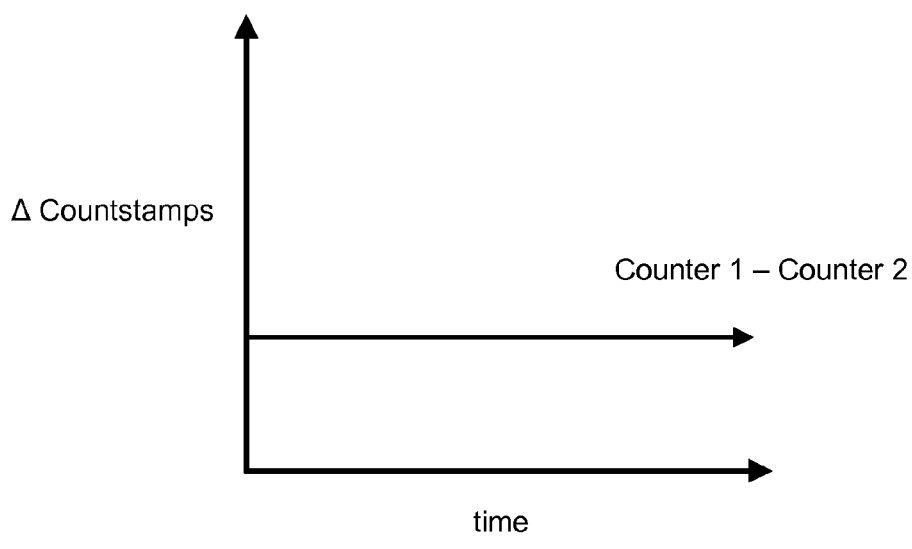
FIG. 5 is a plot of the count stamp differences (Δ count stamps) for counters 1 and 2 depicted in FIG. 4.

To illustrate this mode of operation, we begin with simplified example of clocks of network devices operating at the same rate. FIG. 4 is a plot of the countstamps output from counters 1 and 2 for respective network devices over time. When these clocks count at the same rate, the lines representing the counter outputs of each clock are parallel. The corresponding plot of the delta countstamps between the two clocks is a horizontal line, as shown in FIG. 5. The difference in countstamps between the two clocks is comprised of a baseline clock difference, $D_B$, the flight time between devices, $d_{n,m}$, and the path delay, $p_{n,m}$ between the devices. Equation (14) expresses this countstamp difference for infrastructure nodes 1 and 2 receiving a ping transmitted by infrastructure node 3:

$$\text{Countstamp difference} = D_B + d_{1,3} + p_{1,3} - d_{2,3} - p_{2,3} \quad (14)$$

Equation (15) expresses countstamp difference for infrastructure nodes 1 and 2 receiving a ping transmitted by mobile device (m):

$$\text{Countstamp difference} = D_B + d_{1,m} + p_{1,m} - d_{2,m} - p_{2,m} \quad (15)$$

Figure 6:
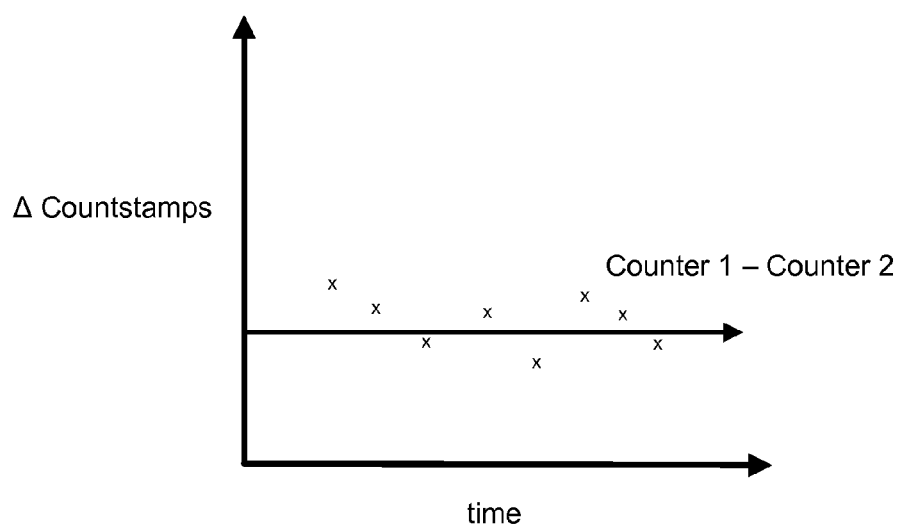
FIG. 6 illustrates a sampling of measured count stamp differences between devices, as an example leading to derivation of clock rate differences among devices in a wireless network.

First, the baseline clock difference is estimated from data collected for infrastructure nodes, according to the expression of equation (14). Referring to the case of no clock drift in FIG. 5, the countstamp difference data corresponds to data points sampled around the horizontal line, which is the best fit to the data points. FIG. 6 shows an example of this data sampling around a plot of the countstamp difference between two nodes. $D_B$ is derived by averaging the data points. This baseline clock difference determination may follow a median approach, in which outlier data points are removed and $D_B$ estimated from the remaining data set.

After determining the baseline clock drift from infrastructure nodes, this baseline clock difference is applied to the equation for the mobile device as explained further here.

The location of the infrastructure nodes is determined at system installation and verified periodically through system monitoring. This location information provides range (and associated time of flight) between infrastructure nodes. With these known ranges/flight times, both the baseline clock difference and the path delays between infrastructure nodes are calculated. To explain this process, we begin with the process of determining the baseline clock difference. Then, we review briefly how to use pingloops to get estimates of the path delays between nodes (the known ones).

Figure 7:
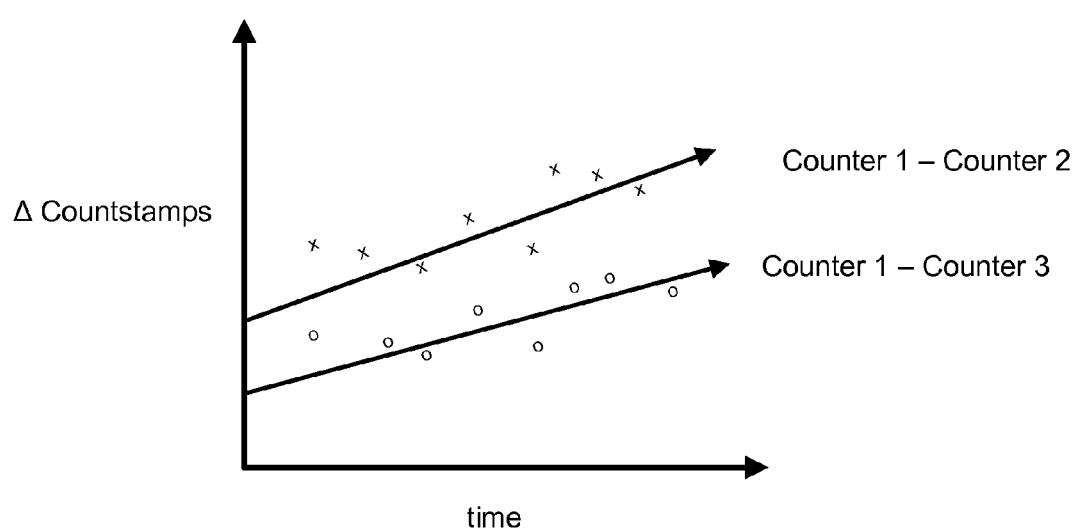
FIG. 7 illustrates a plot of count stamp differences of two pair of devices in a wireless network, showing how clock differences are measured among devices in the wireless network.

Knowing the ranges between known nodes, the baseline clock difference for the case of no clock drift is measured directly, following equation (14). However, the presence of clock drift complicates the calculation. To illustrate, we turn to FIG. 7, which depicts the case where there is a difference in clock rates among the devices in the network. In contrast to FIG. 5, the plots of countstamp differences for two pairs of clocks in FIG. 7 do not have slope of zero. To get a baseline clock difference, the sampled clock difference data is fit to a line using a least squares approach. This process can be further modified to use consistency checking to get a more accurate approximation of the clock rate difference. The clock rate difference should vary slowly, and based on tracking a history of the clock rate, values outside the norm are removed from the data set used to perform the least squares fit. The removal of outliers is a form of consistency checking, and other approaches to checking for consistency may also be used.

Next, a baseline clock difference is determined from the linear approximation of the clock difference data. A reference point is selected for the data set, and this serves as a reference point from which the baseline clock difference is taken for each of the clock difference data sets, each corresponding to pairs of clocks. This reference point is akin to the y-intercept in the depicted plots of count differences. Yet in practice, there is no concept of t=0. Instead, the method selects a reference point and this is used to set the point at which the baseline clock difference is computed for each data set of clock differences between pairs of nodes.

Pingloops calculations for infrastructure nodes provide an estimate of the path delay between nodes. Specifically, the round trip time for a ping loop, can be expressed as $2d_{1,3} + p_{1,3} + p_{3,1} +$ internal device receiver delays. Simplifying this expression by assuming that the same infrastructure device types have the same internal receiver delays, and the path delay on each leg of the trip is the same, the expression becomes $2d1,3+2p_{1,3}$. Knowing the range between nodes, then the path delay is computed by subtracting the flight time and dividing the resulting total path delay for the round trip by 2.

The baseline clock difference derived from infrastructure node calculations is substituted into equation (15). Likewise the path delays are also substituted into the equation (15). The results of these substitutions are differential ranges of the infrastructure nodes relative to the mobile device.

Next, the pseudo ranges between the mobile device and the infrastructure nodes are calculated.

The range difference of the mobile device relative to nodes, 1 and 2, is approximated as:

$$d_{1,m} - d_{2,m} + D_B - \hat{D_B} \tag{16}$$

Where $\hat{D_B}$, is the estimated baseline clock difference, and the path delay is removed using the estimate of path delay from the ping loop calculation.

This leaves a set of range difference estimates that together can be put into a matrix equation in terms of the pseudo ranges that we seek to derive:

$$\begin{bmatrix} 1 & -1 & 0 \\ 1 & 0 & -1 \\ 0 & 1 & -1 \\ 1 & 1 & 1 \end{bmatrix} \begin{bmatrix} d_{1,m} \\ d_{2,m} \\ d_{3,m} \end{bmatrix} = \begin{bmatrix} d_{1,m} - d_{2,m} \\ d_{1,m} - d_{3,m} \\ d_{2,m} - d_{3,m} \\ 0 \end{bmatrix} \tag{17}$$

The pseudo ranges, represented as $d_{n,m}$, where n is the infrastructure node and m is the message received by that node from the mobile device, are computed by solving for them in equation (17). One implementation solves for the pseudo ranges in the rank deficient matrix of equation (17) assuming that they have zero mean. The error bias that this assumption introduces is addressed in the emplacement process. The output of this procedure is a set of pseudo ranges that is supplied to the emplacement process (102, FIG. 1) to locate the position of the mobile device.

Figure 8:
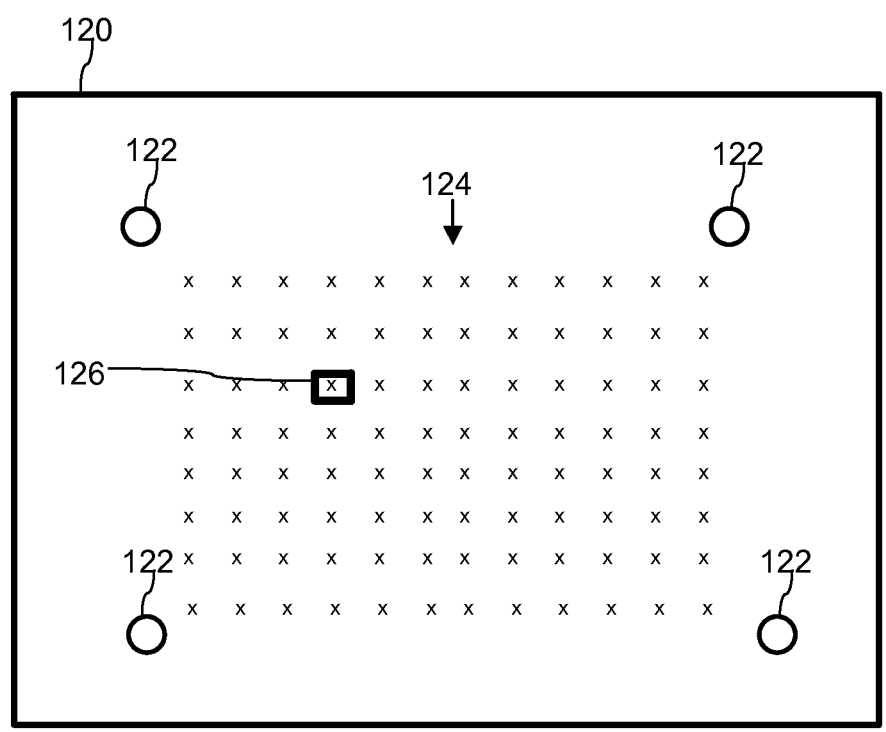
FIG. 8 is a diagram illustrating an example of a configuration of nodes in a positioning network for a venue.

As background for emplacement, we start with a diagram illustrating nodes and a mobile device. FIG. 8 is a diagram illustrating an example of a configuration of nodes in a positioning network for a venue 120. This is a simple example to help illustrate the system, and many other configurations are possible. The venue may be an indoor shopping venue, an office building, an area within a city block, etc. The circles, such as item labeled 122, represent infrastructure nodes. These nodes, as explained previously receive messages from a mobile device within the venue. The "x" marks represent locations where a mobile device 126 (such as a user's smart phone, tablet PC or other wireless network appliance) may be located. In practice, the infrastructure nodes need not be arranged in uniform pattern. Preferably, they are positioned to have relatively clear line of sight to nearby locations within the venue where a mobile device may be located.

When the system is set up for a venue, possible locations for mobile devices within a reasonable precision tolerance (shown with x marks) are recorded in system memory. These locations are converted into ranges to each of the neighboring nodes and stored in a look up table to facilitate fast computation. For each location, the system is checked to ensure that the strength of signal received at the nodes from a mobile device at each of the locations is sufficiently strong. The node wi fi radios and countstamping mechanisms are also calibrated to measure and set internal receiver delays in the system.

In a first stage of emplacement, the process calculates residuals for each candidate location in the venue. The residual is the difference between the range from the candidate location and a node and the pseudo range for that node. This residual can be expressed by the following equation:

$$\begin{bmatrix} d_{1,m} + B + N_1 \\ d_{2,m} + B + N_2 \\ d_{3,m} + B + N_3 \end{bmatrix} - \begin{bmatrix} d_{1x} \\ d_{2x} \\ d_{3x} \end{bmatrix} = R \tag{18}$$

The $d_{nx}$ term of this equation is the range between the node, n, and the candidate position, x. As noted, this can be pre-calculated and stored in a look up table to make computation of the residual, R, efficient. The B term is the bias in the pseudo range values. N represents the noise associated with the particular node.

The possible solution for the position of the mobile device may be the candidate position with the least variation in the residual across all participating nodes. However, when there is significant multipath error, it is better to use multipath mitigation techniques. Next we will describe various mitigation techniques.

First, as noted above, multipath compensation is described in unpublished U.S. patent application Ser. No. 13/187,723 filed Jul. 21, 2001, entitled MULTI-PATH-COMPENSATION METHODS FOR LOCATION-DETERMINATION OF MOBILE DEVICES, which is incorporated above. That document provides additional information on this topic that may be applied here.

In our implementations, we use a combination of multipath estimation and compensation techniques. There are a variety of strategies. The combination of strategies that will perform the best will vary depending on the circumstances of a particular installation. A flexible approach that can leverage multiple different techniques is preferred.

One strategy is to estimate multipath across the network configuration, identify areas in the network where the estimated multipath appears to be clustered around relatively consistent estimates, and assign that multipath estimate to those areas. For example, in one implementation, multipath mitigation is performed first by checking the differential range estimates for a mobile device, e.g., $d_{m,1} - d_{m,2}$, and clipping the estimate to the distance between the nodes, if the differential range is larger than that known distance. For that pair of nodes, a minimum multipath error is estimated, e.g., using techniques in U.S. patent application Ser. No. 13/187, 723. The result is then set as the multipath estimate for that pair. Then for each infrastructure node, the multipath estimate for that node is computed by selecting the largest estimate from the set of minimum estimates per pair of nodes that the node is a member of.

Another strategy is to estimate the multipath error from the residual calculation (the differences between the range of the candidate position to a node and the pseudo range from the node to the mobile device). One such approach is to calculate the residuals for each candidate position, keeping track of the difference between the largest and the smallest residual for each candidate position. The multipath estimate assigned to the node is the minimum differential between the largest and smallest residual. This may be performed for the entire venue or for particular regions defined by bounding areas around nodes.

A variation of the second strategy is to keep track of the sum of residuals for each candidate position and then select the candidate position with the smallest sum of residuals to be the candidate position of the mobile device.

A hybrid strategy combines these strategies to get a better estimate of multipath. Estimates of the multipath for each node are estimated according to each strategy, and then the multipath estimate assigned to the node is the larger of the two estimates from prior multipath estimation stages.

Yet another category of multipath mitigation strategy is to leverage the observation that multipath errors are uncorrelated. Estimates of multipath that are taken under conditions that are uncorrelated are refined by averaging the estimates taken from two or more uncorrelated (independent) conditions. These conditions may simply be measurements made at different points in time, where the multipath error is known or predicted to be un-correlated. Conditions leading to independence of the estimates may be a change in the antennae position of the mobile device. This can be approximated by using estimates from different points in time, or initiated when the mobile device communicates a change in state, such as a change in orientation based on its internal sensors (inertial or accelerometers, for example). If the mobile device is completely stationary, multipath estimates are highly correlated over time. In other words, the multipath estimate for each pair of nodes changes very little under this scenario. However, a very slight change in the mobile devices position, relative to the resolution of positioning, does introduce approximately independent multipath estimates.

There are alternative schemes for implementing multipath mitigation either as a preliminary stage to emplacement or combined with it. One scheme is to estimate the multipath on nodes and subtract the multipath error from the pseudo ranges prior to emplacement. Emplacement then repeats a similar analysis of subtracting the ranges for the candidate positions from the corrected pseudo ranges. The candidate position with lowest variation in residual is determined to be the location of the mobile device.

Another approach is to estimate and remove multipath error during the emplacement process. This effectively combines multipath estimation and compensation into the emplacement process. Again, the location of the mobile device is determined as the location with the lowest variation in residual.

Compression of Shared Pings

The above methods share ping data among devices in packets. This shared ping data is referred to as pungs or pung data. For background information about pungs, please see the space time calibration patent documents incorporated above. The sharing of pung data can increase network traffic. To reduce this network traffic, more computation can be performed on nodes and only the results shared. We have developed a variety of methods to minimize pung traffic, which we refer to as pung compression. These methods are described in further detail below.

By reformulating our methods for sending pung data, it is possible to simultaneously drastically reduce the bandwidth consumed in sending pungs (~an order of magnitude) and decrease the amount of packets dropped by the positioning router (PR). The PR is a programmed network device that receives pungs and routes it to a service for computing position and timing as described above. This service is implemented as a web service, running on one or more servers, that receives associated pings and computes position and timing information. The servers of the web service connect to the positioning network through a wireless network access point node that forms a wireless network with the infrastructure nodes and mobile devices at a particular venue.

To reduce pung traffic and dropping of packets, here are some system configurations:
1. Previous fixed node transmit countstamps (CS) are transmitted as payloads of subsequent pings broadcast among fixed nodes.
    a. The compression scheme involves computing and punging model parameters, as opposed to raw countstamp (CS) values.
    b. The PR also needs these tx CS values. Options here are either to have each fixed node separately unicast this data to the PR, or to require the PR to "listen to" the broadcast pings from the fixed nodes to obtain these values via payload recovery.
    c. It is important that the tx CS values are received at each of the intended fixed nodes (as well as the PR). Therefore, it is advisable to transmit this information multiple times.
2. Each fixed node broadcasts to the other nodes according to a predictable schedule. Periodically a raw Tx countstamp is sent to the other nodes followed by a series of coded prediction errors.
    a. Initial prediction errors are computed based upon the known transmission schedule and the most recent raw Tx countstamp
    b. The prediction errors may be entropy encoded to further reduce bandwidth.
3. Pung data comprised of received pings from other fixed nodes is compressed via a linear model involving the transmitting nodes tx-CS and the receiving nodes rx-CS
    a. To achieve lossless compression the model parameters and prediction error are transmitted to the PR.
4. To minimize the possibility of data outage, it may be advisable to either send pung data comprised of received pings from other fixed nodes multiple times to the PR, or to use a back-channel from PR to fixed node, over which the PR can whine about not receiving expected pungs.
5. Received pings from mobile nodes may also be compressed when punging to the PR. Decent compression can best be achieved by configuring the mobile nodes to transmit according to a (known by everybody) uniform schedule. As in the case with fixed nodes, closer adherence to the schedule leads to better compression.

The following sections provide more detail on the above and further schema for how to bundle the pung data.

Rx Pungs from Fixed Nodes

This type of data is required by a core positioning system (referred to as the core position engine, CPE, which implements the method of FIG. 1) but not any of the other fixed nodes in a local network. The CPE may be implemented within the web service servers, or elsewhere in the network as noted. It makes sense to transmit it via unicast from each fixed node to the router, which in turn communicates it to the CPE. Given a series of received pings from a specific transmitting fixed node in the local network, compression is accomplished using a linear regression model between the tx countstamps of the transmitting node and the rx countstamps of the receiving node. [The next section deals with how fixed nodes get access to one another's tx-countstamps]. The canonical model parameters are dzt and ZT, which are the difference in clock rate and the absolute clock countstamp difference, respectively. ZT varies with time as a function of dzt; so ZT is associated with a specific reference time. To achieve lossless compression we transmit an error vector that is the difference between actual rx countstamps and the rx model predictions.

Complicating Factors

Compressing fixed node pung data would be a rather straightforward matter if it was not for a few problems that arise in practice. A partial list of such problems is given here. The following refers to a "harmonic block." As described in related US Patent Application Publication 20090213828, ping data is collected, sorted and organized into blocks of data for a time interval referred to as a harmonic block (HB). This is defined in terms of ping events, e.g., 10 sets of ping data per node, which depending on the ping frequency, varies in length (e.g., around 10 milliseconds in the approach of 20090213828). Some of the challenges for processing pings are:

1. Not all pings that are transmitted in a harmonic block by one fixed node in a network are received by the other fixed nodes in the network.
    a. This problem can be overcome by transmitting a binary string that indicates which expected pings were received and which pings are missing.
2. Sometimes the received countstamps take on outlier values, resulting in enormous deviations from the model.
    a. This situation can be dealt with by correctly recognizing such countstamps as outliers and then treating them as missed pings.
3. In the presence of multipath, the received pings can sometimes take on a multi-modal distribution, in which there will effectively be a single dzt and multiple ZTs. There are several ways to deal with this problem:
    a. Do not do anything different. Simply accept the fact that it will take more bits to compress the error vector.
    b. Eliminate all pings from the mode with larger multipath before computing the model parameters.
    c. Allow for this case during encoding. In addition to encoding multiple ZTs, we would need to tell the router which pings belong to which ZT.

Preferred Schema for Fixed Node Rx-Pungs

In this schema a "key" pung packet (KPP) is sent followed by a chain of predicted pung packets (PPPs). The point of this approach is that each pung packet is received by the PR. Otherwise, PPPs cannot be decoded. For normal ranges of HB pung size in terms of the number of transmitted pings, KPPs require twice the bandwidth of PPPs. If it is found in a particular installation that pung drop-outs are frequent, this schema should not be used. Here are a few ways to mitigate problems of unreliable pung reception:

A KPP would be sent every so often.
A back-channel from the PR to the receiving node would be used to alert the node that expected pung data was not received.
    Should not be used when pung dropouts are frequent due to increased latency
Pung packets are transmitted more than once by default when pung dropouts are frequent.

KPP Schema (~150 Bits when 8 Pings are Involved)

1. Header information
    a. KPP indicator (1 bit, is this a KPP or not?)
    b. Transmitting Node ID (8 bits)
    c. Serial Number of first transmit CS in HB (16 bits)
        i. Used to match pung data to appropriate set of transmit countstamps at the positioning router
    d. Optional: Expected number of received pings in the KPP (8 bits)
        i. It is recommended that this is a global parameter that everybody knows and abides by. There is no reason to send it.
2. Model parameters
    a. dzt—slope value; the measured rate difference between the transmitting and receiving clocks (~10 bits)
    b. ZT—intercept value; effectively the model difference between the transmitting clock and the receiving clock at a specific reference tx-countstamp value. (64 bits)
3. A string of bits that indicates which of the transmitted pings from the tx node in question were actually received out of a maximum number $N_{fxHB}$
    a. Actual size should be less than $N_{fxHB}$ because the probability of any given ping being received is not equal to 50%. Usually it is much higher. Classic compression principles should reduce the average size.
4. Deviation from model for each of the received pings. The deviation is typically within a count value or two. Shouldn't require more than an average of 3 bits per ping to cover it
5. RSSI values of the received pings
    a. 8 bits for first RSSI value
    b. The remaining RSSI values are differentially encoded (~2 bits each)

PPP Schema (~65 Bits when 8 Pings are Involved)

1. Header information
    a. KPP indicator (1 bit, is this a KPP or not?)
        i. This bit is '0' in this case
    b. Transmitting Node ID (8 bits)
    c. Bit indicating whether the serial number of the first transmit countstamp is as expected.
        i. Normally, the serial number would be as expected. The exception would be when the receiving node "decides" not to pung due to a dearth of received pings.
    d. If serial number is not as expected, serial Number of first transmit countstamp in PPP (16 bits)
        i. Alternatively, might consider sending the number of periods that have elapsed since the last pung packet. The serial number can be derived from this number. Should be ~4 bits
2. Model parameters: Offset and rate model parameters are predicted from stored previous block's values. Any swing in predicted offset error over magnitude 1 is typically due to a dual-state situation
    a. dzt—slope value; the measured rate difference between the transmitting and receiving clocks (~3 bits)
    b. ZT—intercept value; effectively the model difference between the transmitting clock and the receiving clock at a specific reference tx-countstamp value. (~4 bits)
3. A string of bits that indicates which of the transmitted pings from the tx node in question were actually received out of a maximum number $N_{fxHB}$
4. Deviation from model for each of the received pings. The deviation is typically within a count value or two. Shouldn't require more than an average of 3 bits per ping to cover it 5. RSSI values of the received pings: all RSSI values are differentially encoded (~2 bits each)

Alternative Schema for Fixed Node Rx-Pungs

In this schema solely KPPs are sent (please see previous subsection for schema layout). This schema is appropriate when dropped rx-pungs are frequent and perhaps when no back-channel is available or desirable.

Lossy Compression

A lossy compression scheme might entail punging the model parameters but not the vector of individual errors relative to the model parameters. In this case, only the origin tx-countstamp would need to be communicated to the CPU. Some potential problems with this approach include inaccuracy of clock rate differences, and failure to establish a common origin for all pings received from a given transmitter, which occurs when there are missing pings. This second problem may perhaps be overcome by estimating what the origin would be if the ping corresponding to the origin is missing.

Tx Countstamp Transmission

Tx countstamps from each fixed node in the local network are required at both the PR and each of the other fixed network nodes. In order to calculate model parameters for all pings received from a given fixed-node transmitter, each receiver that receives said pings must know the transmitter's tx countstamps. Hence these should be broadcast to the other fixed nodes in the network as payloads of normal pings. The PR also must know the tx-countstamps used to compute model parameters for every receiver. One way to handle this is to have the PR selectively listen for payload-carrying pings from the transmitters when broadcasting to other nodes in the network. The term "selectively" is used to connote the fact that not necessarily all pings are payload-carrying. Moreover, the PR knows the transmission schedule of the transmitting nodes in the network. So it knows when and to whom it needs to listen. Another way to handle this issue is to retransmit the tx-countstamps to the PR in a unicast mode, along with other pung data.

The following is a description of what exactly need to be transmitted. Given this schema, the tx data may be sent one countstamp at a time, or in bundles like a pung.

TX Countstamp Transmission Payload

1. Is the countstamp a raw countstamp or predicted version? (1 bit)
2. If, the countstamp is raw
    a. CS Serial number (16 bits)
    b. Raw CS value (64 bits)
3. If the countstamp is predicted
    a. Indicator bit that if set says the next tx countstamp is different than expected
    b. If indicator bit is set either
        i. Send full 16 bit serial number or
        ii. Encode the difference with expected serial number (much less than 16 bits)
    c. Prediction error of the current CS value from last raw CS and the number of pings that have elapsed since it was transmitted
        i. Prediction is based upon the assumption of a regular transmission schedule of outgoing pings. The precision of the prediction in practice controls the number of bits needed to encode the prediction error.
        ii. Based on analysis of collected data, range of prediction error can be encoded with ~20 bits.
        iii. Prediction error is not uniformly distributed; so fewer bits may be needed if entropy coding is used.
4. ping serial number of I ping, Raw 64-bit countstamp of I ping, $delta_2$, $delta_3$, ... $delta_N$
    a. $delta_m$ is defined as the difference between the actual ping countstamp of $ping_m$ and its predicted value. Prediction is based upon the assumption of a regular transmission schedule of outgoing pings. The precision of the prediction in practice controls the number of bits needed to encode each delta.

It is important that the PR and all fixed nodes receive the raw countstamp transmissions. Otherwise, all predicted versions will not have a basis on which to operate, rendering them useless. It is somewhat less problematic when predicted tx countstamps are not received. In this case, the fixed node rx pung schema requires a slight modification to compensate for missing tx data. At any rate, it is desirable to transmit the tx CS data more than once. Rough calculations from data recorded at initial implementations within a building similar to a large retail store (sometimes referred to as a big box or warehouse store) show that the successful ping reception rate is usually >90%. It is higher in the lab testing environment. The number of times the TX CS data should be sent depends upon our willingness to accept loss of ability to do the modeling calculations for rx pungs involving the transmitter. For example, in the case of a large retailer building, choose N such that p(Lost pung)>=(1−0.9)^N. Note: this model presumes that the probability of a dropped ping is independent of whether neighboring pings are received (it probably is not).

Note: robustness of the system may be increased by using the back channel from the PR to send tx CS data when it is communicating to a given fixed node that it is missing expected pung data.

Pungs Involving Mobile Data

The received pings from one or more mobile transmitters (that do not have tx countstamps) can also be compressed. The first ping from a mobile device is assigned a differential rx-countstamp value that is relative to the receiving node's transmitted pings. More specifically, the differential value is the number of clock ticks after the most recent transmitted ping. Assuming that the transmitter is on a regular ping schedule of N (equally-spaced) pings per second, we need log 2(clockRate/N) bits to encode the differential value and several additional bits to specify which ping in the harmonic block the received ping is after. For infrastructure nodes, we have used GS-1010 TLS, and GS-1011, "system-on-a-chip" wireless devices available from GainSpan Corporation of Los Gatos, Calif. For a Gainspan node running at 33 Mhz and transmitting 3 pings per second, approximately 24 bits are needed to encode the differential value. If the fixed-node transmission schedule of pings is not uniform in time, the number of bits necessary to encode the rx-countstamp depends upon the distance in time between $ping_k$ and $ping_{k+1}$, when the receive countstamp lies between these values.

Another way to accomplish differential encoding of the first ping received from a mobile device is to use the fixed node rx countstamps as a reference. Although this approach slices the time-interval finer, it may not prove any more useful because it would require encoding which fixed node transmitted the ping of interest.

To encode pings after the first received ping from a mobile device, we can use the same schedule differencing trick we discussed for encoding tx-countstamps. More precisely, it is assumed that each mobile device will ping at a constant rate that is known to the network nodes. The greater the precision of this transmission rate relative to the network node clock resolution, the fewer bits that are needed to encode actual deviations from the predicted schedule. One minor complicating factor is that it may be possible for the application on the mobile device to be configured for more than one possible discrete ping rate. This matters little as long as the network nodes are aware of each possible configuration. Specifically, a few additional bits would be required to encode the active configuration. When discussing the schema for encoding mobile node pings, we will leave out this possibility. In practice it may be reasonable to globally establish one ping rate that all mobile devices use.

Perhaps a more vexing problem is the potential variability in scheduling precision the set of possible participating mobile devices may have. For example, a device that has a faster clock may be more precise than a device with a slower clock. A simple solution would be to allocate a number of bits that encodes for the lowest common denominator case. A better solution would be to make sure the type of device is identified in its ping payload and to use a number of bits appropriate for that particular device. An inconvenience here is that if entropy coding is used to encode schedule deviations, a different model to do the encoding for every potential device must be stored on the fixed nodes.

Preferred Schema for Mobile Pings in a Harmonic Block

The presumption is that the PR received the previous pung data from the receiver. The system may need confirmation that the PR received pung data via a back channel. Otherwise, one cannot assume the PR knows about previous pungs when dealing with the current one. The back-channel is probably best construed as a safety feature. A good practice would be to transmit the pung data 2 or more times to ensure it gets through. Transmission on the back-channel would then only be employed in the unlikely event that both pungs were not received.

Case A: No Received Pings from Any Mobile Devices in Previous Pung Packet

1. Pings from a new mobile (0 or 1)?
   a. If 0, end of pung
   b. If 1, continue to 2
2. Serial number of mobile 1 (? Bits)
   a. Although there is a good chance that we will be able to reliably associate mobile pings received at one receiver with those from another receiver, the serial number of the mobile must be communicated to the CPU so that the mobile ultimately receives a position estimate.
   b. Also need type of mobile device if that is not readily identifiable from the serial number
3. Which tx ping first mobile ping is after (3-4) bits, depending upon harmonic block size
4. Differential value of first mobile ping relative to previous tx ping ~24 bits
   a. Distribution of this value is presumed uniform; so it is not entropy encoded.
5. Binary string that is the length of the additional number of pings from the mobile that the receiver expects to receive in this harmonic block; e.g. (1, 0, 1) would indicate that of the 3 additional pings the receiver expects to hear, it only hears the first and third. The binary string will typically contain more ones than zeros; so it can be encoded.
6. Set of differences relative to presumed mobile transmission schedule that the network node receives, if applicable (<24 bits each)
   a. Depending upon the frequency of transmission and when the first mobile ping is received, there may be no expected transmissions
   b. It is expected that the distribution of these differences is non-uniform and we will therefore benefit from entropy encoding them, provided we use the appropriate model for the distribution.
7. Continue steps 1 through 6 as long as there are additional new mobile devices heard during this harmonic block Case B: Received Pings from One or More Mobile Devices in Previous Pung Packet 1. Are there new (expected) pings from the mobile device in this slot the last tx pung (0 or 1)?
   a. If '1' continue to step 2
   b. If 0, repeat 1 while there are slots for remaining previously transmitting mobile devices. Otherwise, go to step 5.
   c. If we believe that the mobile device has stopped transmitting by virtue of some critical number of non-received pings reached, the slot for this mobile is deleted and the remaining mobile slots move up the list to occupy its place next pung
2. Binary string that is the length of the additional number of pings from the mobile that the receiver expects to receive in this harmonic block
3. Set of differences relative to presumed mobile transmission schedule that the network node receives, if applicable (<24 bits each)
4. Continue steps 2-4 while there are remaining expected previous mobile slots. Then go to step 5.
5. Pings from a new mobile (0 or 1)?
   a. If 0, end of pung
   b. If 1, continue to 6
6. Serial number of mobile 1 (? Bits)
7. Which tx ping first mobile ping is after (3-4) bits, depending upon harmonic block size
8. Differential value of first mobile ping relative to previous tx ping ~24 bits
9. Binary string that is the length of the additional number of pings from the mobile that the receiver expects to receive in this harmonic block
10. Set of differences relative to presumed mobile transmission schedule that the network node receives, if applicable (<24 bits each)
11. Continue steps 5 through 10 as long as there are additional new mobile devices heard during this harmonic block Another Schema for Mobile Pings in a Harmonic Block In this case the schema is memoryless and therefore the first ping from a mobile device in the HB is a new event, even if pings from that device were heard in previous HBs. Although simpler, this schema consumes more bandwidth on average.

Case A: No Received Pings from Any Mobile Devices in Previous Pung Packet

1. Pings from a mobile (0 or 1)?
   a. If 0, end of pung
   b. If 1, continue to 3
2. Serial number of mobile 1 (? Bits)
3. Which tx ping first mobile ping is after (3-4) bits, depending upon harmonic block size
4. Differential value of first mobile ping relative to previous tx ping ~24 bits
5. Binary string that is the length of the additional number of pings from the mobile that the receiver expects to receive in this harmonic block; e.g. (1, 0, 1) would indicate that of the 3 additional pings the receiver expects to hear, it only hears the first and third.
6. Set of differences relative to presumed mobile transmission schedule that the network node receives, if applicable (<24 bits each)
7. Continue steps 1 through 6 as long as there are additional mobile devices heard during this harmonic block System Architectures for Scaling Up Position Service to Many Mobile Nodes We have designed an implementation of the positioning system so that it can scale up to handle requests for position and timing for several mobile devices within a venue. For a particular venue, infrastructure nodes (e.g., GainSpan devices noted above) are placed at ceiling height and distributed around the building, without requiring a predetermined pattern. The nodes listen to mobile device messages (e.g., from user's smartphones), and pass data among each other and ultimately route that data to the web service through a wi-fi access node in buildings wireless Local Area Network. A small piece of software code runs on the user's device, instructing it to chirp to the wi-fi network. These chirps are simply UDP packets, which are countstamped upon receipt by infrastructure nodes as detailed above. A router in the network sends associated ping data to the servers of a cloud based web service, which implements the positioning and timing engine. The web service returns (X, Y, Z, t) position and time information to the requesting system, which could be an analytic system monitoring mobile devices, the mobile devices themselves, or other requesting software or device.

With this background, the following sections describe configurations for organizing and routing data collected from a position network for processing by a core positioning engine. This configuration is designed to handle the data processing for multiple moving mobile devices within a venue.

The Fixed Node Connections Structure

The following is an example of a data structure constructed to store fixed node (e.g., infrastructure node) data.

| Region | Node ID | Node Coords | Connected Nodes | Node Distances |
|--------|---------|-------------|-----------------|----------------|
| A | 1 | (x1, y1) | 2, 3, 6, 7 | D12, d13, d16 |
| A | 4 | (x4, y4) | 2, 5, 8, (B, 2) | |
| B | 2 | | (A, 4), 1, 3, 5 | |

In addition to illustrating this example data structure, we note the following:
   The core positioning methods are given the network parameters, such as node ID, region #, and node coordinates
   It is up to the core methods to determine who can hear whom through analyzing the received data packets. This is done during an initialization phase of processing Separate Processing of Mobile and Fixed Node Core Operations In this version, we have tried to separate as much as possible fixed node and mobile node operations. For the case of the fixed nodes, this encompasses two tasks.
1. Compute channel delays between receivers and reference transmitters.
2. Compute rx pair parameters with all nodes that a given receiver can hear.
   a. In general, there are more valid and useful rx pairs than we compute here. For example, a pair of nodes may have a physical obstruction between them that prevents them from hearing one another. Nevertheless, they may still hear the same transmitter (in the sense of receiving its RF signal)

Table for Computing Fixed Infrastructure Parameters

| Duplex Pair ({node 1 Region, node1 ID}, {node 2 Region, node2 ID) | Common transmitters |
|---|---|
| (A, 1), (A, 2) | (A, 3), (B, 2) |
| (A, 1), (A, 3) | (A, 2), (B, 2) |
| (A, 1), (B, 2) | (A, 2), (A, 3) |

The underlying rule for computing fixed infrastructure parameters is that the rx pair must comprise a full duplex pair.
Pairs are constructed from the list of which fixed nodes heard other fixed nodes (Fixed Node Connections Structure)
Organization of the pairings proceeds from the lowest node number to the highest node number within a region and from lowest region number to highest region number. Each pair is counted once.

Mobile Receiver List

Another data structure is constructed to store a list of nodes that receive pings from a corresponding mobile device by mobile ID. For example, see the following table:

| Mobile ID | Rx ID, Region ID |
|---|---|
| M1 | (1, A), (2, A),(6, A),(10, A),(6, B) |
| M2 | (1, C), (2, C), (7, C), (5, D) |
| M3 | (2, E), (5, E), (8, E), (7, F), (9, F) |

Constructing Mobile Data Records Structures

The system constructs data records per mobile device for which positioning and timing is computed in the core methods. The following provides an example of a mobile data record data structure and processing of it.

1. Given the selected mobile ID from the menu, build a list of receivers whose data we want to grab, by region:
   a. For M1, we have Region A: (1, 2, 6) and Region B: (6)
   b. For M2, we have Region C: (1, 2, 7) and Region D: (5)
   c. For M3, we have Region E: (2, 5, 8) and Region F: (7, 9)
2. Construct a list of potential receiver pairs for each mobile ID. Then from each potential pair see if it is a full duplex pair, which means we already have reference data calculated for it.

| Mobile ID | Rx ID, Region ID | Full duplex pairs | Unconnected pairs |
|---|---|---|---|
| M1 | (1, A), (2, A), (6, A), (10, A), (6, B) | {(1, A), (2, A)}, {(1, A), (6, B)}, {(2, A), (10, A)}, {(6, A), (6, B)} | {(1, A), (10, A)}, {(1, A), (6, B)}, {(2, A), (6, A)}, {(2, A), (6, B)}, {(10, A), (6, B)} |
| M2 | (1, C), (2, C), (7, C), (5, D) | | |
| M3 | (2, E), (5, E), (8, E), (7, F), (9, F) | | |

3. Get all countstamp data from each listed receiver in the region for the chosen mobile ID
   a. For (M1,1,A) we have the following. NI means not important for this discussion

| Tx Region | Tx Num | Tx countstamp | Rx countstamp |
|---|---|---|---|
| — | M1 | NI | NI |
| A | 2 | NI | NI |
| A | 3 | NI | NI |
| A | 6 | NI | NI |
| A | 7 | NI | NI |
| B | 5 | NI | NI | b. For (M1,2,A) we have

| Tx Region | Tx Num |
|---|---|
| — | M1 |
| A | 1 |
| A | 3 |
| A | 5 |
| A | 7 |
| B | 5 | d. Finally, for (M1,B,6) we have the following. Evidently, (B,6) is a boundary receiver. It is closely associated with both receivers in A and B.

| Tx Region | Tx Num |
|---|---|
| — | M1 |
| A | 6 |
| A | 7 |
| B | 1 |
| B | 3 |
| B | 5 |

4. Build receiver pair/reference transmitter list for all non-connected receiver pairs. Continuing with the M1;A(1, 2,6);B(6) example, we generate the following lists:

| Rx Pair | Reference Transmitters |
|---|---|
| {(1, A), (10, A)} | {(3, A), (7, A), (5, B)} |
| {(1, A), (6, B)} | {(3, A), (7, A)} |
| {(2, A), (6, A)} | {(3, A), (5, A), (7, A)} |
| {(2, A), (6, B)} | {(7, A), (5.B)} |
| {(10, A), (6, B)} | {(7, 3)} |

5. If there are transmitting nodes in the list of all reference transmitters that are not also in the list of receivers that received pings from the mobile node, we need to get the received data from all such transmitters. In this example, we have only grabbed data from one of the reference transmitters, (3,B). So, we need to grab all received data from the others.
6. For all receivers in the composite list of receivers (primary receivers+non-mobile receiving reference transmitters), get receiver coordinates and distances to any other node in the fixed node infrastructure that the receiver is expected to hear. This information is made available in the shared-memory partition dedicated to all receivers within a given region. An example of how this data is formatted is as follows:

| Receiver in R3 | Position | Nodes with expected comm | Distances |
|---|---|---|---|
| 1 | (x, y, z) | {(R3, 2), (R3, 3), (R3, 4), (R3, 5), (R3, 7)), {(R4, 6)} | d1, d2, d3, . . . , dN |
| 2 | Similar | Similar | Similar |
| . . . | . . . | . . . | . . . |
| 7 | (x, y, z) | Similar | Similar |

7. At this point all data required for the current mobile data record (MDR) is available and ready to process.

Additional Preprocessing

1. All data submitted to the core positioning method needs to be put in a format that is similar to the current harmonic block format.

Pseudo-Code Describing Required Core Method Adaptation for Scaling Up for Several Mobile Devices The following is a pseudo code listing of software processing positioning and timing for multiple mobile devices.
1. Highest level-loop over MDRs
   a. Get all relevant Rx data for the current mobile ID as per steps of previous section
   b. See if there is any stored data available for any of the Rx pairs in the list or ping loop data involving any reference transmitters and receivers. If so, feed that to the core method in addition to the entirety of receiver data.
   c. Apply regular non-cooperative processing to Rx pair/ Ref trans. list
   d. In addition to positioning estimates for the current mobile device, computed parameters for all Rx pairs and Rx/ref Tx ping-loops are exported. These may be used again in some other iteration of the highest level loop; i.e. this happens when the same receiver pair hears multiple mobile devices during the same processing period.
2. Internal modifications to handle non-cooperative devices (e.g., transmit only mobile devices)
   a.
      i. Round robin ranger (rrr) is software routine in the system that organizes data from nodes. It follows a node numbering and ordering scheme. It also builds Rx pairs and reference transmitter lists according to this scheme. We adapt this routine to accept the already constructed list of rxpairs/ref tx as input.
      ii. Need to make sure any potentially shared data is exported
      iii. Relevant node distances are to be computed outside of this routine, outside of the core for the most part.
   b. ProcessBlock_mobileTx. This routine is adapted to expect mobile devices that do not have a constant transmit ID.
   c. Compute_fixed_node_path_delays
      i. Similar to rrr, this routine expects a particular node ordering and numbering scheme. It needs to be adapted to accept a list of duplex pairs as input.
      ii. The routine also expects that clock rate parameters are packaged in a particular way.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the processes may be implemented in a programmable computer or a special purpose digital circuit. Similarly, they may be implemented in software, firmware, hardware, or combinations of software, firmware and hardware. The methods described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of computing positioning of a mobile device in a wireless network, the method comprising:
   receiving a message sent from a mobile device at each of a set of network nodes at corresponding network node locations;
   exchanging pings among the network nodes, including assigning local clock values to pings upon sending and receiving the pings;
   from the local clock values exchanged among the network nodes, determining clock differences among the network nodes;
   from the clock differences, determining path delay between the network nodes;
   from data provided by the network nodes about receipt of the message and the path delays, determining pseudo range estimates between the mobile device and the network nodes; and
   determining location of the mobile device by evaluating differences between candidate positions of the mobile device and the pseudo range estimates, and selecting a candidate location with minimum error criteria as the location of the mobile device;
   wherein multipath error is estimated for the network nodes and removed from the pseudo range estimates prior to determining the location, and determining location comprises evaluating variation of a differential between ranges of candidate positions of the mobile device and the pseudo range estimates, and selecting a location where the variation of the differential satisfies predetermined criteria.

2. The method of claim 1 wherein multipath error is estimated for the network nodes and removed from the pseudo range estimates.

3. The method of claim 2 wherein the wherein multipath error is estimated for the network nodes and compensated for in the determining of the location of the mobile device.

4. The method of claim 2 wherein the multipath error is estimated by determining areas with similar estimated multipath error and assigning multipath errors corresponding to the areas to the network nodes within the areas.

5. The method of claim 2 wherein the multipath error is estimated by evaluating differential range estimates of network nodes relative to the mobile device computed from the message sent to the network nodes from the mobile device, and assigning multipath error estimates to pairs of nodes.

6. The method of claim 1 wherein full duplex exchanges between network nodes is used to determine the path delays.

7. The method of claim 1 including evaluating clock value differences between pairs of network nodes over time to determine the clock differences of local clocks within the network nodes.

8. The method of claim 7 wherein the evaluating comprises a linear modeling of fitting clock count differences to a linear model to derive clock difference parameters among pairs of nodes.

9. The method of claim 8 wherein a consistency checking process is applied to clock count data before applying the linear modeling, wherein the consistency checking evaluates data collected over time and removes outlier clock count data.

10. The method of claim 1 wherein the mobile device operates in a transmit only mode, sending the message to the network nodes, which count stamp the message upon receipt, and including deriving differential ranges of the network nodes to the mobile device from count stamps of the message at the network nodes.

11. The method of claim 1 wherein estimated multipath error is used to compensate for multipath error in computing the differential.

12. The method of claim 1 wherein multipath error estimates are refined by averaging estimates of multipath error from un-correlated conditions, and using the refined estimates of multipath error to compensate for multipath error in the determining of the mobile device location.

13. A method of computing positioning of a mobile device in a wireless network, the method comprising:
    receiving a message sent from a mobile device at each of a set of network nodes at corresponding network node locations;

exchanging pings among the network nodes, including assigning local clock values to pings upon sending and receiving the pings;

from the local clock values exchanged among the network nodes, determining clock differences among the network nodes;

from the clock differences, determining path delay between the network nodes;

from data provided by the network nodes about receipt of the message and the path delays, determining pseudo range estimates between the mobile device and the network nodes; and determining location of the mobile device by evaluating differences between candidate positions of the mobile device and the pseudo range estimates, and selecting a candidate location with minimum error criteria as the location of the mobile device;

wherein multipath error is estimated for the network nodes and removed from the pseudo range estimates;

wherein the wherein multipath error is estimated for the network nodes and compensated for in the determining of the location of the mobile device; and wherein multipath error estimates are refined by averaging estimates of multipath error from un-correlated conditions, and using the refined estimates of multipath error to compensate for multipath error in the determining of the mobile device location.

14. A method of computing positioning of a mobile device in a wireless network, the method comprising:

receiving a message sent from a mobile device at each of a set of network nodes at corresponding network node locations;

exchanging pings among the network nodes, including assigning local clock values to pings upon sending and receiving the pings;

from the local clock values exchanged among the network nodes, determining clock differences among the network nodes;

from the clock differences, determining path delay between the network nodes;

from data provided by the network nodes about receipt of the message and the path delays, determining pseudo range estimates between the mobile device and the network nodes; and determining location of the mobile device by evaluating differences between candidate positions of the mobile device and the pseudo range estimates, and selecting a candidate location with minimum error criteria as the location of the mobile device;

wherein multipath error is estimated for the network nodes and removed from the pseudo range estimates prior to determining the location; and wherein the multipath error is estimated by evaluating differential range estimates of network nodes relative to the mobile device computed from the message sent to the network nodes from the mobile device, and assigning multipath error estimates to pairs of nodes.

* * * * *